(12) United States Patent
Kondo

(10) Patent No.: US 11,237,355 B2
(45) Date of Patent: Feb. 1, 2022

(54) LENS UNIT, CAMERA SYSTEM, AND ELASTIC MEMBER

(71) Applicant: FUJIFILM Corporation, Tokyo (JP)

(72) Inventor: Nobuyuki Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 393 days.

(21) Appl. No.: 16/419,980

(22) Filed: May 22, 2019

(65) Prior Publication Data

US 2019/0271826 A1 Sep. 5, 2019

Related U.S. Application Data

(63) Continuation of application No. PCT/JP2017/038228, filed on Oct. 24, 2017.

(30) Foreign Application Priority Data

Nov. 28, 2016 (JP) .............................. JP2016-230088

(51) Int. Cl.
*G02B 7/02* (2021.01)
*G02B 7/14* (2021.01)
*G03B 17/14* (2021.01)
*G02B 17/00* (2006.01)

(52) U.S. Cl.
CPC ................. *G02B 7/14* (2013.01); *G02B 7/02* (2013.01); *G02B 17/00* (2013.01); *G03B 17/14* (2013.01)

(58) Field of Classification Search
CPC . G02B 7/14; G02B 7/02; G02B 17/00; G03B 17/14
USPC .................................................. 359/827–830
See application file for complete search history.

(56) References Cited

U.S. PATENT DOCUMENTS

2016/0269617 A1 9/2016 Tomita

FOREIGN PATENT DOCUMENTS

| CN | 105359023 A | | 2/2016 | |
|---|---|---|---|---|
| GB | 728188 A | * | 4/1955 | ............... B43K 5/14 |
| JP | 7-128718 A | | 5/1995 | |
| JP | 7-181580 A | | 7/1995 | |
| JP | 10-186486 A | | 7/1998 | |

(Continued)

OTHER PUBLICATIONS

International Preliminary Report on Patentability for International Application No. PCT/JP2017/038228, dated Nov. 20, 2018, with English translation.

(Continued)

*Primary Examiner* — William Choi
(74) *Attorney, Agent, or Firm* — Birch, Stewart, Kolasch & Birch, LLP

(57) ABSTRACT

There are provided a lens unit, a camera system, and an elastic member that can prevent an annular elastic member from being entangled. The lens unit includes an optical system that includes at least one lens, a lens barrel that receives the optical system, a lens mount that is provided on one end side of the lens barrel and includes a plurality of bayonet claws, and an annular elastic member that is mounted on the lens mount. The elastic member includes a protruding portion that is positioned on the one end side and protrudes inward in a radial direction, and a dent that is positioned on an outer peripheral side opposite to the protruding portion so as to be closer to the other end side than the protruding portion.

16 Claims, 9 Drawing Sheets

(56) References Cited

FOREIGN PATENT DOCUMENTS

| JP | 11-174562 A | 7/1999 |
| JP | 2003-15010 A | 1/2003 |
| JP | 2008-51923 A | 3/2008 |
| JP | 2009-300926 A | 12/2009 |
| JP | 2009-300927 A | 12/2009 |
| JP | 3206443 U | 9/2016 |

OTHER PUBLICATIONS

International Search Report and Written Opinion of the International Searching Authority for International Application No. PCT/JP2017/038228, dated Jan. 16, 2018, with English translation of the International Search Report.
Japanese Office Action for corresponding Japanese Application 2018-552472, dated Sep. 2, 2020, with English translation.
Chinese Office Action and Search Report for Chinese Application No. 201780073117.4, dated Sep. 3, 2020, with English translation of the Office Action.
Chinese Office Action and Search Report for Chinese Application No. 201780073117.4, dated Mar. 15, 2021, with English translation of the Office Action.
Japanese Office Action for corresponding Japanese Application No. 2018-552472, dated Feb. 3, 2020, with English translation.

* cited by examiner

OA

OA

OA

LENS UNIT, CAMERA SYSTEM, AND ELASTIC MEMBER

CROSS-REFERENCE TO RELATED APPLICATIONS

This application is a Continuation of PCT International Application No. PCT/JP2017/038228 filed on Oct. 24, 2017, which claims priority under 35 U.S.C § 119(a) to Patent Application No. 2016-230088 filed in Japan on Nov. 28, 2016, all of which are hereby expressly incorporated by reference into the present application.

BACKGROUND OF THE INVENTION

1. Field of the Invention

The present invention relates to a lens unit that is mounted in a bayonet manner, a camera system, and an elastic member.

2. Description of the Related Art

In the related art, a structure where a lens unit is mounted on a camera body in a bayonet manner has been known in a camera system that is used while a lens unit is interchanged. There is a case where dust or water may infiltrate into a gap between the lens unit and the camera body in a certain environment where the camera system is used.

To solve this problem, various structures have been proposed to give a dust-proof function and a drip-proof function between the lens unit and the camera body.

For example, JP2009-300927A discloses a technique that exerts a dust-proof effect and a drip-proof effect by making a distal end portion of an elastic member be close contact with the outer peripheral surface of a camera-side mount in a case where a lens barrel holding the annular elastic member is mounted on the camera-side mount.

SUMMARY OF THE INVENTION

However, there is a concern in the technique of JP2009-300927A that the elastic member may be entangled between the lens barrel and the camera-side mount in a case where the lens barrel is mounted on the camera-side mount.

The invention has been made in consideration of the above-mentioned circumstances, and an object of the invention is to provide a lens unit, a camera system, and an elastic member that can prevent an elastic member from being entangled.

A lens unit according to an aspect of the invention comprises an optical system that includes at least one lens, a lens barrel that receives the optical system, a lens mount that is provided on one end side of the lens barrel in a direction of an optical axis and includes a plurality of bayonet claws, and an annular elastic member that is mounted on the lens mount. The elastic member includes a protruding portion that is positioned on the one end side and protrudes inward in a radial direction, and a dent that is positioned on an outer peripheral side opposite to the protruding portion so as to be closer to the other end side of the lens barrel than the protruding portion in the direction of the optical axis.

According to another aspect of the invention, in the lens unit, the dent has a shape of an arc.

According to another aspect of the invention, in the lens unit, the protruding portion has a cross section having a shape of a curved surface.

According to another aspect of the invention, in the lens unit, the protruding portion includes a chamfer on the one end side.

According to another aspect of the invention, the lens unit further includes a convex portion that is provided on one of the elastic member and the lens mount and a concave portion that is provided on the other of the elastic member and the lens mount, and the convex portion and the concave portion are engaged with each other.

A camera system according to another aspect of the invention includes the lens unit, and a camera body that includes a body mount including a body claw to be engaged with the bayonet claws of the lens unit. The protruding portion of the elastic member of the lens unit biases the body mount in the radial direction.

An annular elastic member according to another aspect of the invention includes a protruding portion that is positioned on one end side in a height direction and protrudes inward in a radial direction, and a dent that is positioned on an outer peripheral side opposite to the protruding portion so as to be closer to the other end side than the protruding portion in the height direction. The height direction is the direction of a normal vector to a plane that includes a circular opening of the annular elastic member.

According to the invention, it is possible to prevent the annular elastic member from being entangled.

DESCRIPTION OF THE PREFERRED EMBODIMENTS

A preferred embodiment of the invention will be described below with reference to accompanying drawings. The invention will be described using the following preferred embodiment.

The invention can be modified by various methods without departing from the scope of the invention, and embodiments other than this embodiment can be used. Accordingly, all modifications within the scope of the invention are included in the claims.

Figure 1:
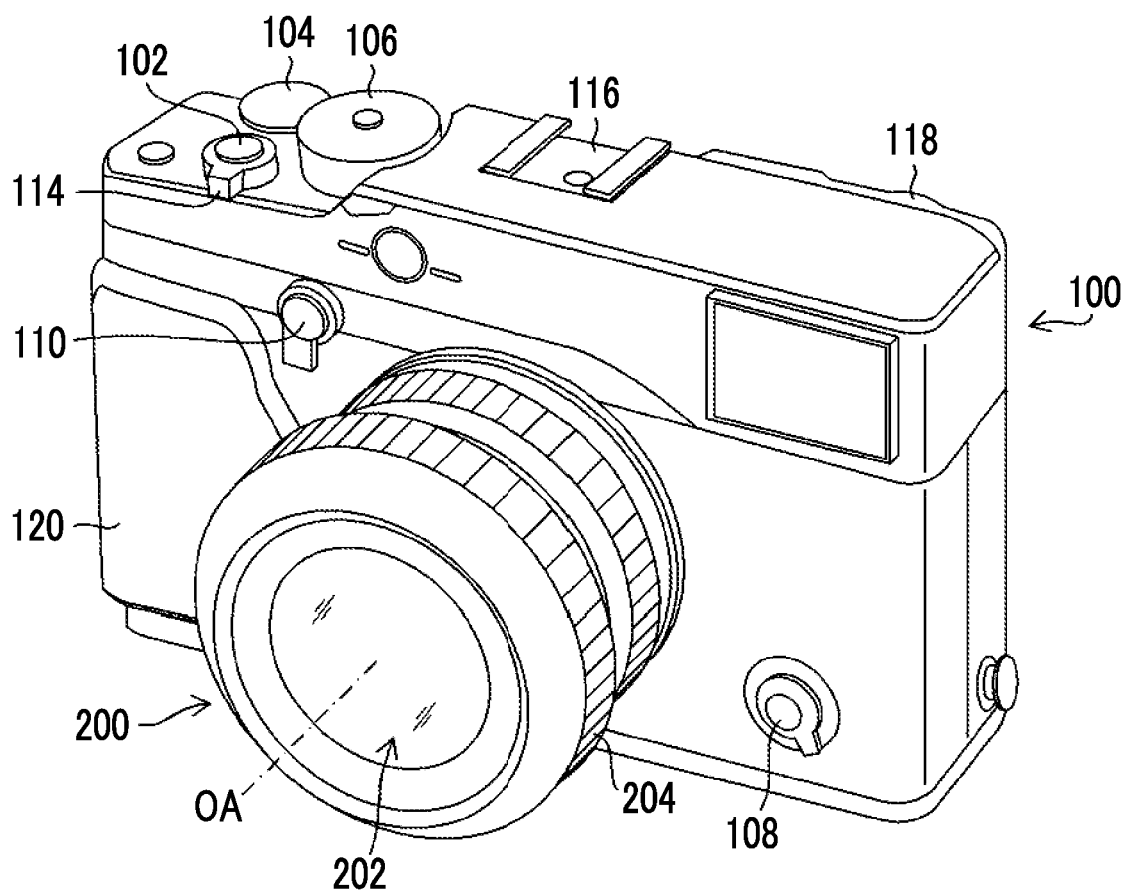
FIG. 1 is a perspective view showing the appearance of a camera system in a state where a lens unit is mounted on a camera body.
Figure 1:
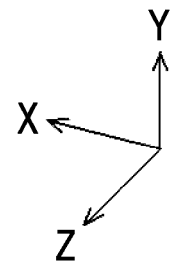
Figure 2:
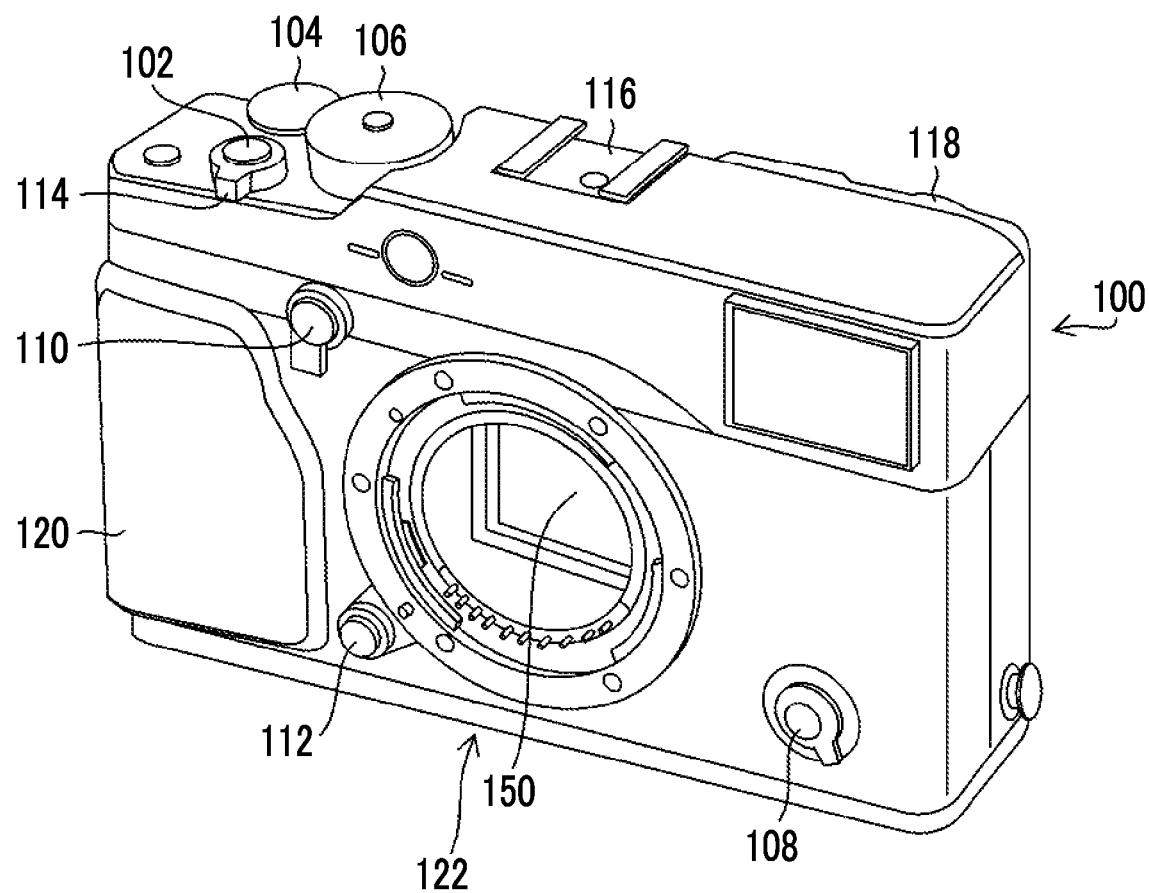
FIG. 2 is a perspective view showing the appearance of the camera body.

A lens unit of this embodiment will be described with reference to the drawings. FIG. 1 is a perspective view showing the appearance of a camera system in which a lens unit is mounted on a camera body, and FIG. 2 is a perspective view showing the appearance of the camera body. FIG.

Figure 4:
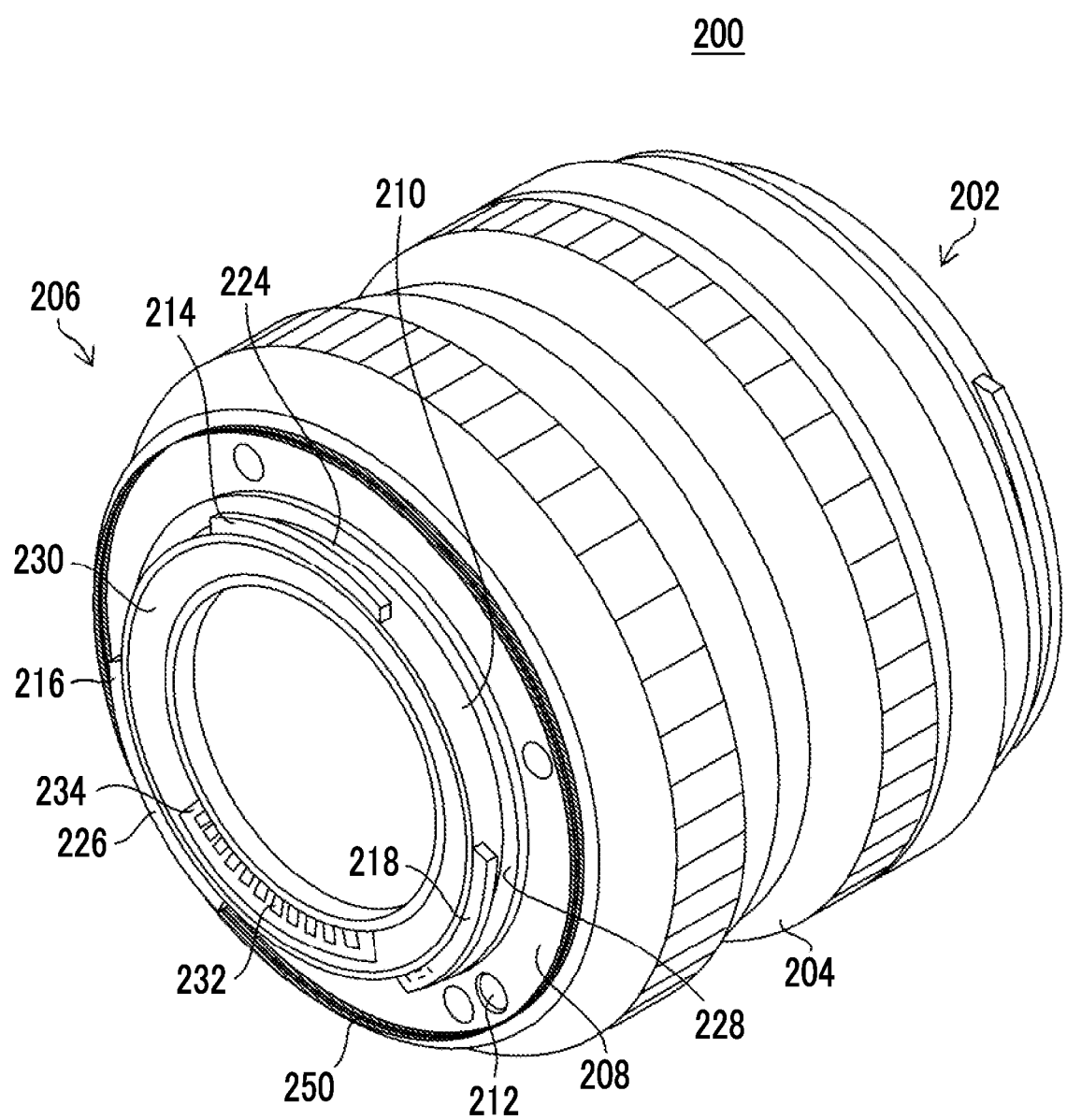
FIG. 4 is a perspective view showing the appearance of the lens unit.

3 is a enlarged view of a body mount. FIG. 4 is a perspective view showing the appearance of the lens unit.

In this specification, a direction along an optical axis OA (a Z direction in FIGS. 1 and 2) is referred to as a front-rear direction and a subject side is referred to as a front side. Further, in a plane orthogonal to the optical axis OA, a direction (an X direction in FIGS. 1 and 2) along a long side of an image sensor 150 (see FIG. 2) is referred to as a lateral direction or a left-right direction and a direction (a Y direction in FIGS. 1 and 2) along a short side of the image sensor 150 is referred to as a vertical direction or an up-down direction.

As shown in FIG. 1, the camera system 1 includes a camera body 100 and a lens unit 200. The camera system 1 is a lens-interchangeable camera system 1, and the lens unit 200 is attachably and detachably mounted on the camera body 100.

As shown in FIGS. 1 and 2, the camera body 100 has the shape of a rectangular box of which the thickness in the front-rear direction is smaller than the height in the up-down direction. The camera body 100 comprises a shutter button 102, an exposure correction dial 104, a shutter speed dial 106, a focus mode switching lever 108, a finder switching lever 110, a lens attachment/detachment button 112, a power lever 114, and the like as operation members. The shutter button 102, the exposure correction dial 104, and the shutter speed dial 106 are disposed on the upper side of the camera body 100.

The camera body 100 comprises a hot shoe 116, an electronic view finder 118, a grip 120, and a body mount 122. The grip 120 is disposed on the left side of the camera body 100. A user performs a release operation while gripping the grip 120.

The body mount 122 is a mounting portion on which the lens unit 200 is to be mounted. The body mount 122 has a bayonet structure.

As shown in FIG. 1, the lens unit 200 includes an optical system 202 that includes at least one lens and a lens barrel 204 that receives the optical system 202. The optical system 202 including lenses means an assembly of optical members that are used to form the image of an object by allowing the lenses to transmit light.

The lens barrel 204 is a substantially cylindrical body that can receive the optical system 202, and the shape of the lens barrel 204 is not limited as long as the lens barrel 204 can receive the optical system 202. Further, the lens barrel 204 can comprise, for example, a focus ring, a stop ring, and the like, and can form an appropriate image by the adjustment of the focus ring, the stop ring, and the like.

As shown in FIG. 2, the image sensor 150, which is exposed from the body mount 122, is disposed in the camera body 100. The image sensor 150 converts the image of a subject, which is formed by the optical system 202 of the lens unit 200, into electrical signals. A publicly known image sensor, such as a charge coupled device (CCD) image sensor or a complementary metal oxide semiconductor (CMOS) image sensor, is used as the image sensor 150.

Figure 3:
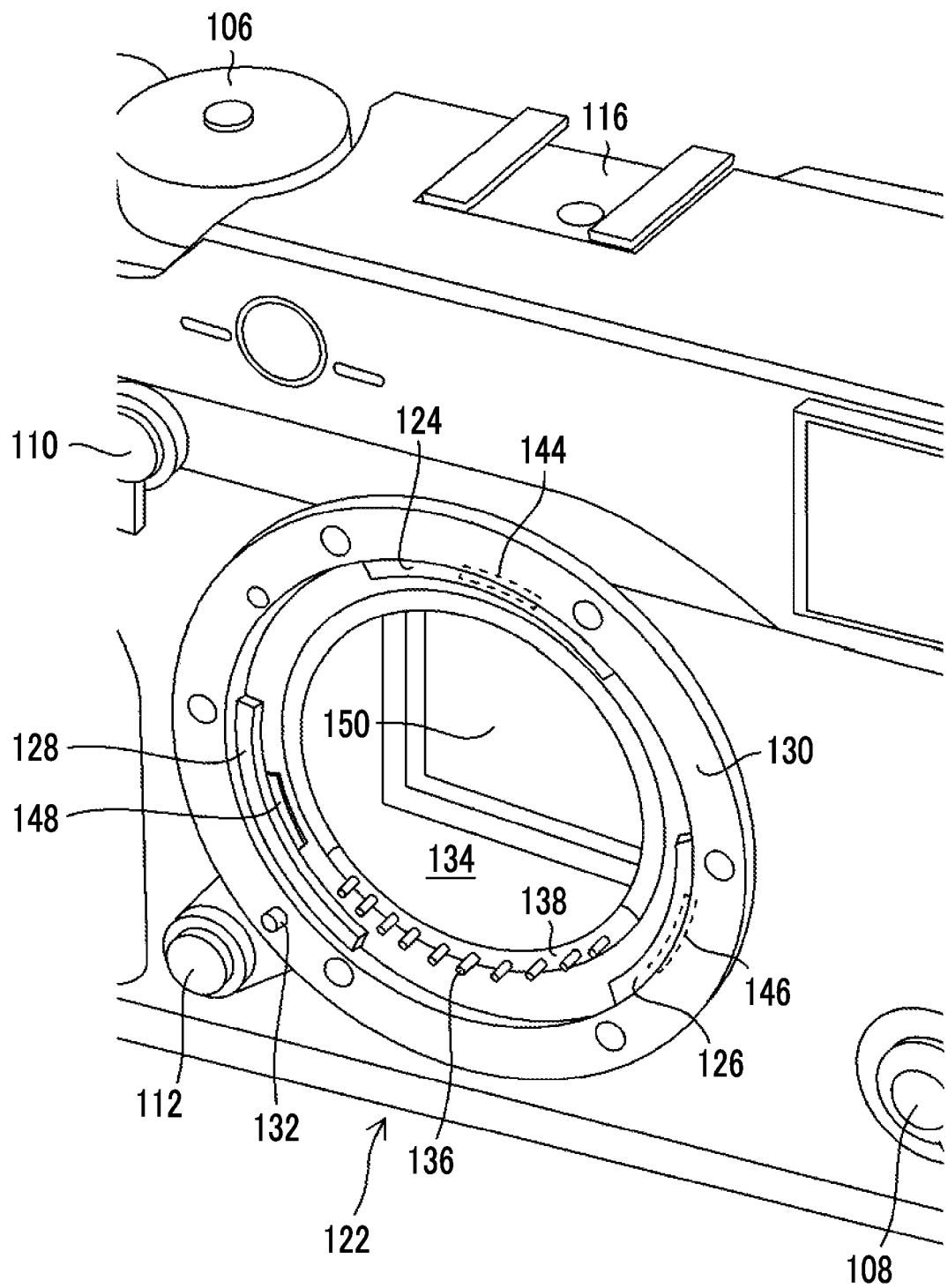
FIG. 3 is an enlarged view of a body mount.

FIG. 3 is an enlarged view of the body mount 122 provided on a camera. Three body claws 124, 126, and 128 are disposed on the body mount 122 at intervals to mount a lens mount 206 (see FIG. 4) to be described later on the body mount 122. The body mount 122 may include at least one body claw. The size of the interval between the body claws 124, 126, and 128 is set to a size that can allow each of bayonet claws 214, 216, and 218 of the lens mount 206 to pass.

In this embodiment, a body mount ring 130 including an opening 134 is disposed on the front side of the camera body 100. The three body claws 124, 126, and 128 are formed so as to protrude inward from the body mount ring 130 in the radial direction of the opening 134. The inner peripheral portions of the three body claws 124, 126, and 128 substantially have the shape of an arc. The front surface of the body mount ring 130 functions as a body mount-reference surface of the camera body 100.

It is preferable that the body mount ring 130 and the body claws 124, 126, and 128 are integrated with each other. The body mount ring 130 and the body claws 124, 126, and 128 can be formed integrally with each other by, for example, pressing or the like. During the pressing, pressing is preferably performed on the body mount ring 130 in a direction toward the rear side from the front side. Since the direction of the pressing is set to the direction toward the rear side from the front side, the front surfaces of the body claws 124, 126, and 128 can be formed of rounded surfaces. On the other hand, there is a case where the rear surfaces of the body claws 124, 126, and 128 are formed as edges from which burrs protrude rearward.

The lens attachment/detachment button 112 is disposed on the front side of the camera body 100. A locking pin 132, which can be moved in the front-rear direction in conjunction with an operation for pressing the lens attachment/detachment button 112, is disposed on the body mount ring 130. The lens attachment/detachment button 112 and the locking pin 132 are biased to the front side by biasing means (not shown). Accordingly, the locking pin 132 protrudes through a through-hole of the body mount ring 130 in a state where the lens attachment/detachment button 112 is not pressed. By the operation for pressing the lens attachment/detachment button 112, the locking pin 132 is moved to a position where the locking pin 132 is retracted inside the through-hole from a position where the locking pin 132 protrudes from the body mount ring 130.

A plurality of signal contacts 136 are arranged on a seat 138 of the body mount 122 along the inner periphery of the opening 134 of the body mount ring 130. Each of the signal contacts 136 is formed of, for example, a pin. The signal contacts 136 are biased to the front side of the camera body 100 by biasing means (not shown), and protrude forward from the seat 138. The signal contacts 136 can be adapted to be capable of being moved in the front-rear direction by biasing means.

Mount springs 144, 146, and 148 are arranged on the body mount 122 at positions corresponding to the rear sides of the body claws 124, 126, and 128, respectively. In a case where the lens unit 200 is mounted on the camera body 100, the mount springs 144, 146, and 148 bias the bayonet claws 214, 216, and 218 of the lens unit 200 to the rear side in the direction of the optical axis OA. The mount springs 144, 146, and 148 pull the lens unit 200 toward the camera body 100, and allow a lens mount-reference surface and the body mount-reference surface to be in contact with each other. The positions of the image sensor 150 of the camera body 100 and the optical system 202 of the lens unit 200 in the direction of the optical axis OA and an optical distance between the image sensor 150 and the optical system 202 are determined.

FIG. 4 is a perspective view showing the appearance of the lens unit 200 that is viewed from the side thereof to be mounted on the camera body 100. As shown in FIG. 4, the lens mount 206 to be mounted on the body mount 122 (see FIG. 3) is provided on one end side of the lens barrel 204 of the lens unit 200, that is, the rear side of the lens barrel 204.

That is, the lens mount 206 is provided on one end side of the optical system 202, which is received in the lens barrel 204, on the optical axis OA. The lens mount 206 has a bayonet structure.

The lens mount 206 comprises a lens mount ring 208, a cylindrical portion 210 that extends rearward from the lens mount ring 208, and the three bayonet claws 214, 216, and 218 that are arranged in the circumferential direction of the cylindrical portion 210 and extend outward in the radial direction of the cylindrical portion 210.

The lens mount 206 is provided with the three bayonet claws 214, 216, and 218, but is not limited thereto. For example, the number of the bayonet claws may be 2 or 4.

The surface of the lens mount ring 208 exposed from the lens barrel 204 functions as a lens mount-reference surface. In a case where the lens unit 200 is mounted on the camera body 100, the lens mount-reference surface of the lens mount ring 208 and the body mount-reference surface of the body mount ring 130 are in contact with each other.

As shown in FIG. 4, the bayonet claws 214, 216, and 218 are arranged at intervals. The size of the interval between the bayonet claws 214, 216, and 218 is set to a size that can allow each of the body claws 124, 126, and 128 of the body mount 122 to pass.

The lens mount-reference surface of the lens mount ring 208 is provided with a pin hole 212 into which the locking pin 132 of the camera body 100 is to be inserted.

Three bayonet grooves 224, 226, and 228 are defined by the lens mount-reference surface and the respective bayonet claws 214, 216, and 218 of the lens mount 206.

The lens mount 206 includes a mount cover 230 that is fixed to the inner peripheral side of the cylindrical portion 210. A plurality of signal contacts 232 are arranged on a seat 234 provided on the exposed surface that is provided on the rear side of the mount cover 230. In a case where the lens unit 200 is mounted on the camera body 100, the signal contacts 232 of the lens unit 200 and the signal contacts 136 of the camera body 100 are electrically connected to each other.

An annular elastic member 250 is mounted on the outer periphery of the lens mount ring 208. In a case where the lens unit 200 is mounted on the camera body 100, the elastic member 250 gives a dust-proof function and a drip-proof function to the camera system 1 as described later.

Figure 5:
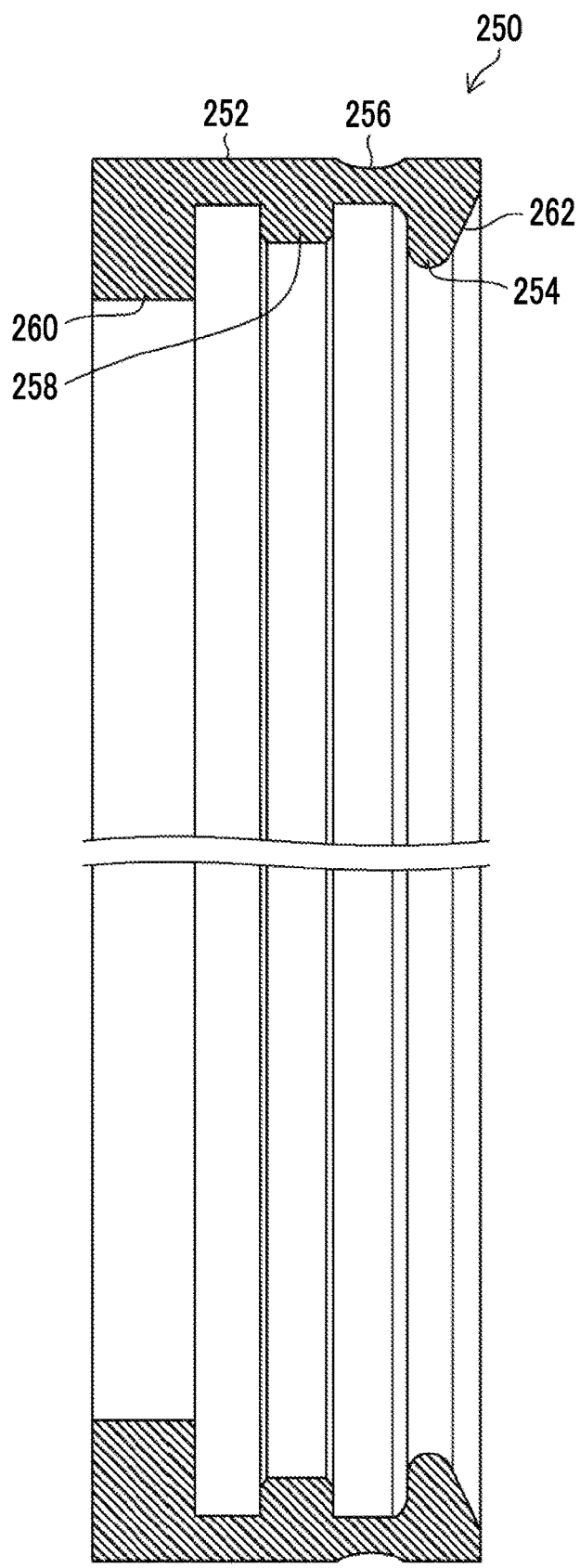
FIG. 5 is a cross-sectional view of an elastic member.

FIG. 5 is a cross-sectional view of the elastic member 250. The annular elastic member 250 is formed of a cylindrical part 252 comprising a protruding portion 254 that is provided on one end side of the cylindrical part 252 so as to protrude inward in the radial direction and a dent 256 that is positioned on the outer peripheral side opposite to the protruding portion 254 so as to be closer to the other end side thereof than the protruding portion 254. One end side in the Z direction (see FIG. 1) is the rear side, and the other end side in the Z direction (see FIG. 1) is the front side.

The cylindrical part 252 includes a convex portion 258 that is provided near the middle thereof so as to protrude inward in the radial direction, and includes a flange portion 260 that is provided at the other end side thereof so as to protrude inward in the radial direction.

Rubber, elastomer, a molding resin, or the like can be used as the material of the annular elastic member 250. Examples of the rubber can include silicone rubber. The hardness of the silicone rubber can be appropriately changed.

A chamfer 262 can be provided on the side of the protruding portion 254 facing the body mount ring 130. The chamfer 262 is inclined so as to be spaced from the body mount ring 130 as approaching the inner peripheral side.

Figure 6:
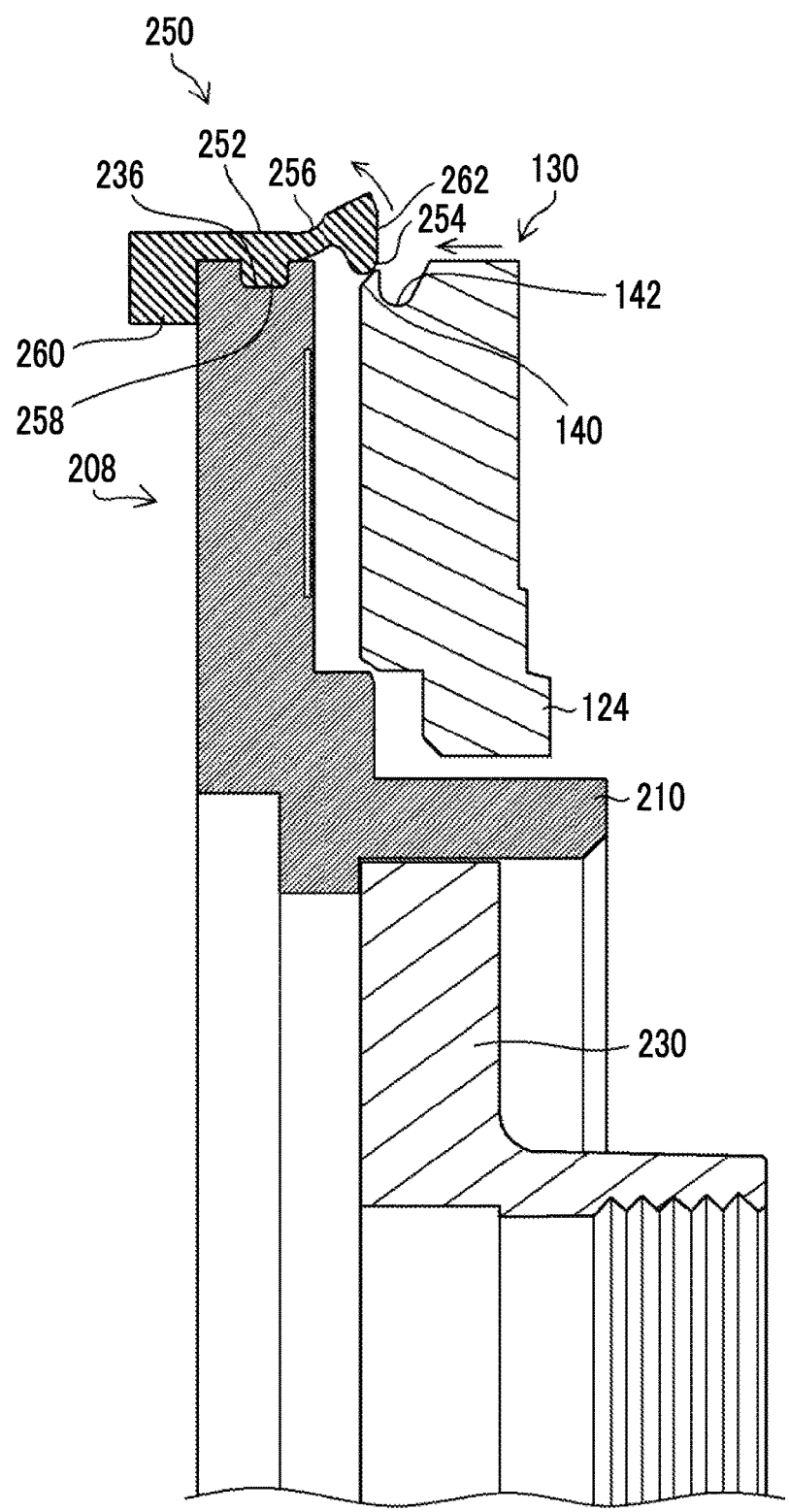
FIG. 6 is an enlarged cross-sectional view in a case where a lens mount is to be mounted on the body mount.
Figure 7:
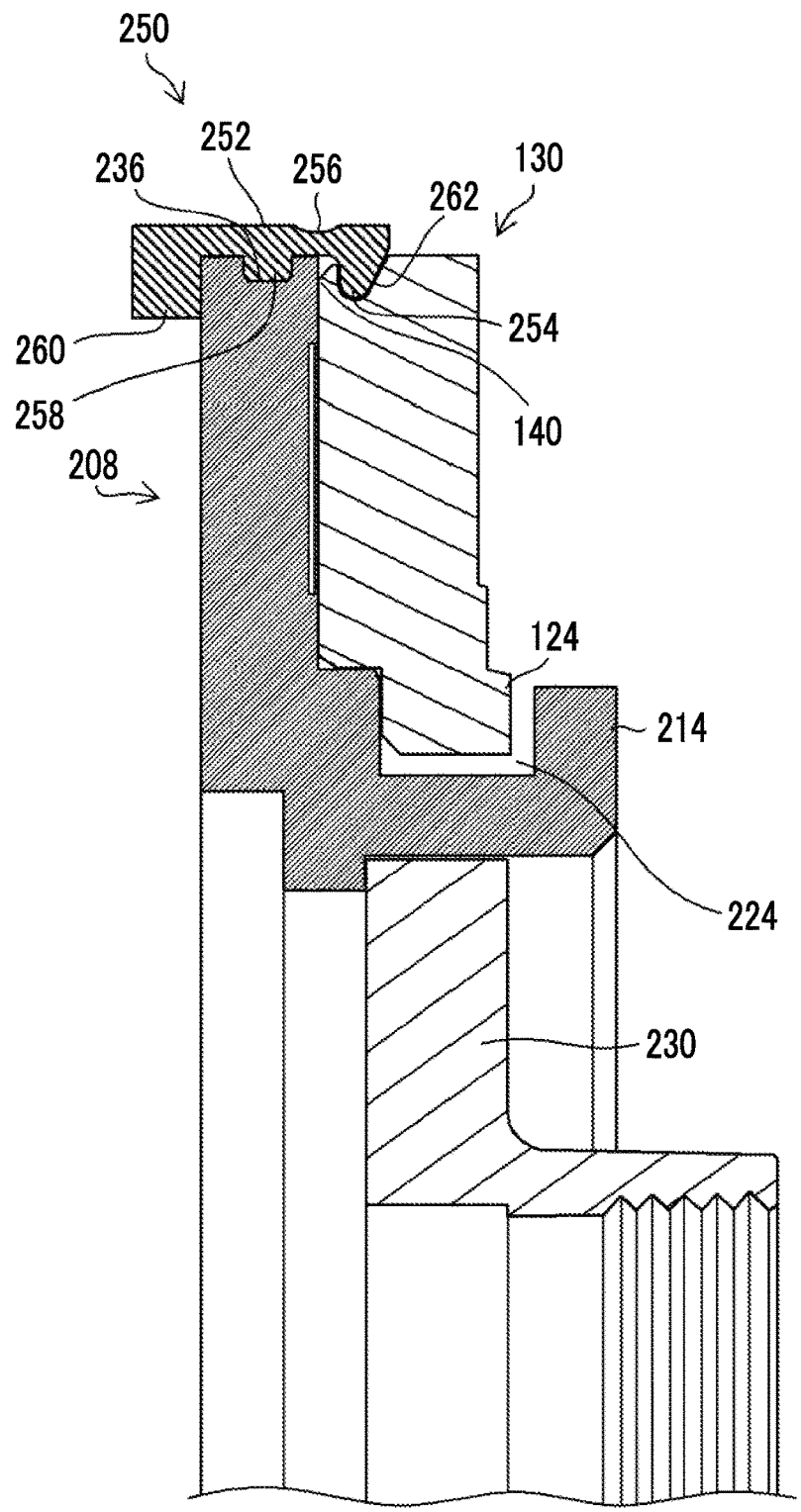
FIG. 7 is an enlarged cross-sectional view after the lens mount is mounted on the body mount.

The action of the elastic member 250, which is obtained in a case where the lens unit 200 is mounted on the camera body 100, will be described with reference to FIGS. 6 and 7. FIG. 6 is an enlarged cross-sectional view in a case where the lens mount is to be mounted on the body mount. FIGS. 6 and 7 are cross-sectional views seen in a direction orthogonal to the optical axis OA of the optical system (not shown).

As shown in FIG. 6, the elastic member 250 is mounted on the lens mount ring 208. Since the inner diameter of the elastic member 250 is smaller than the outer diameter of the lens mount ring 208, the lens mount ring 208 is pressed by the elastic force of the elastic member 250. Accordingly, the elastic member 250 can be attachably and detachably fixed to the outer peripheral surface of the lens mount ring 208. Further, the flange portion 260 of the elastic member 250 and the front surface of the lens mount ring 208 are in contact with each other.

A concave portion 236 is formed on the outer periphery of the lens mount ring 208. The convex portion 258 of the elastic member 250 and the concave portion 236 of the lens mount ring 208 are engaged with each other. Since the convex portion 258 and the concave portion 236 are engaged with each other, the elastic member 250 and the lens mount ring 208 can be positioned.

The cross section of the protruding portion 254 can be set to the shape of a curved surface. In a case where the cross section of the protruding portion 254 is set to the shape of a curved surface, the contact area between the outer peripheral surface of the body mount ring 130 and the protruding portion 254 can be increased. The shape of an arc, the shape of an elliptical arc, and the shape of a parabola can be exemplified as the shape of a curved surface. However, the cross-sectional shape of the protruding portion 254 is not limited to the shape of a curved surface, and may be a rectangular shape or a polygonal shape.

The elastic member 250 is provided with the dent 256. The dent 256 of the cylindrical part 252 serves as a fulcrum, and allows the protruding portion 254 of the elastic member 250 to be displaced outward in the radial direction. It is preferable that the dent 256 has the shape of an arc. The shape of an arc includes an arc, an elliptical arc, a parabola, and the like. In a case where the dent 256 has the shape of an arc, stress, which is generated when the protruding portion 254 of the elastic member 250 is displaced, can be distributed.

A chamfer 140 can be provided on the front surface of the body mount ring 130. The chamfer 140 is inclined so as to be spaced from the lens mount ring 208 as approaching the outer peripheral side of the body mount ring 130.

A concave portion 142 can be formed on the outer periphery of the body mount ring 130. The protruding portion 254 of the elastic member 250 is fitted to the concave portion 142 of the body mount ring 130. The concave portion 142 may not be provided on the body mount ring 130.

In a case where the lens unit is mounted on the camera body, the lens unit and the camera body are positioned. As shown in FIG. 6, the body claw 124 of the body mount ring 130 and bayonet claws (not shown) are positioned not to overlap with each other. The lens mount ring 208 and the body mount ring 130 are moved relative to each other in a direction where the lens mount ring 208 and the body mount ring 130 approach each other. The body claw 124 is moved along the cylindrical portion 210.

The chamfer 262 of the protruding portion 254 and the chamfer 140 of the body mount ring 130 come into contact with each other. The protruding portion 254 and the body mount ring 130 can be smoothly moved relative to each other by the chamfer 262 of the protruding portion 254 and the chamfer 140 of the body mount ring 130. Accordingly, the lens unit is easily inserted into the camera body. The chamfer 140 and the chamfer 262 may have the shape of an arc, a linear shape, or a polygonal shape in cross-sectional view.

As shown in FIG. 6, the protruding portion 254 of the elastic member 250 is displaced outward in the radial direction while the dent 256 serves as a fulcrum. Accordingly, it is possible to prevent the elastic member 250 from being entangled between the lens mount and the body mount. The displacement of the protruding portion 254 can be made larger than that in a case where the elastic member 250 does not include the dent 256.

FIG. 7 is an enlarged cross-sectional view after the lens mount is mounted on the body mount. As shown in FIG. 7, the lens mount-reference surface of the lens mount ring 208 and the body mount-reference surface of the body mount ring 130 are in contact with each other. The lens unit and the lens mount are rotated relative to each other, so that the body claw 124 is fitted to the bayonet groove 224. Accordingly, the body claw 124 and the bayonet claw 214 are engaged with each other.

The protruding portion 254 biases the body mount ring 130 in the radial direction by the elastic force of the elastic member 250. Since the protruding portion 254 has the shape of a curved surface, the protruding portion 254 is easily crushed and the contact area between the outer peripheral surface of the body mount ring 130 and the protruding portion 254 can be increased. A dust-proof effect and a drip-proof effect can be obtained.

Speed at which the body mount ring 130 and the lens mount ring 208 come into contact with each other can be reduced by the elastic member 250. As a result, sound, which is generated in a case where the lens unit is mounted on the camera body, can be reduced. Since the elastic member 250 covers the whole circumference of the body mount ring 130 and the lens mount ring 208, the leakage of sound can be suppressed.

Since stress is distributed over the entire protruding portion 254, which is to be displaced, by the dent 256, the concentration of stress can be avoided. As a result, the durability of the elastic member 250 can be improved.

A portion of the elastic member 250, which includes the protruding portion 254, can be mainly deformed due to the dent 256. Since this deformation can prevent the convex portion 258 of the elastic member 250 and the concave portion 236 of the lens mount ring 208 from being disengaged from each other, the elastic member 250 and the lens mount ring 208 can be reliably positioned. A dust-proof effect and a drip-proof effect can be further improved by the engagement between the convex portion 258 of the elastic member 250 and the concave portion 236 of the lens mount ring 208.

The appearance of the elastic member 250 can be improved in terms of design by the dent 256 of the outer periphery of the elastic member 250.

Since the protruding portion 254 biases the outer periphery of the body mount ring 130 inward in the radial direction while being in contact with the body mount ring 130, it is possible to adjust a torque load that is to be applied in a case where the lens unit is to be manually operated by the elastic member 250.

Figure 8:
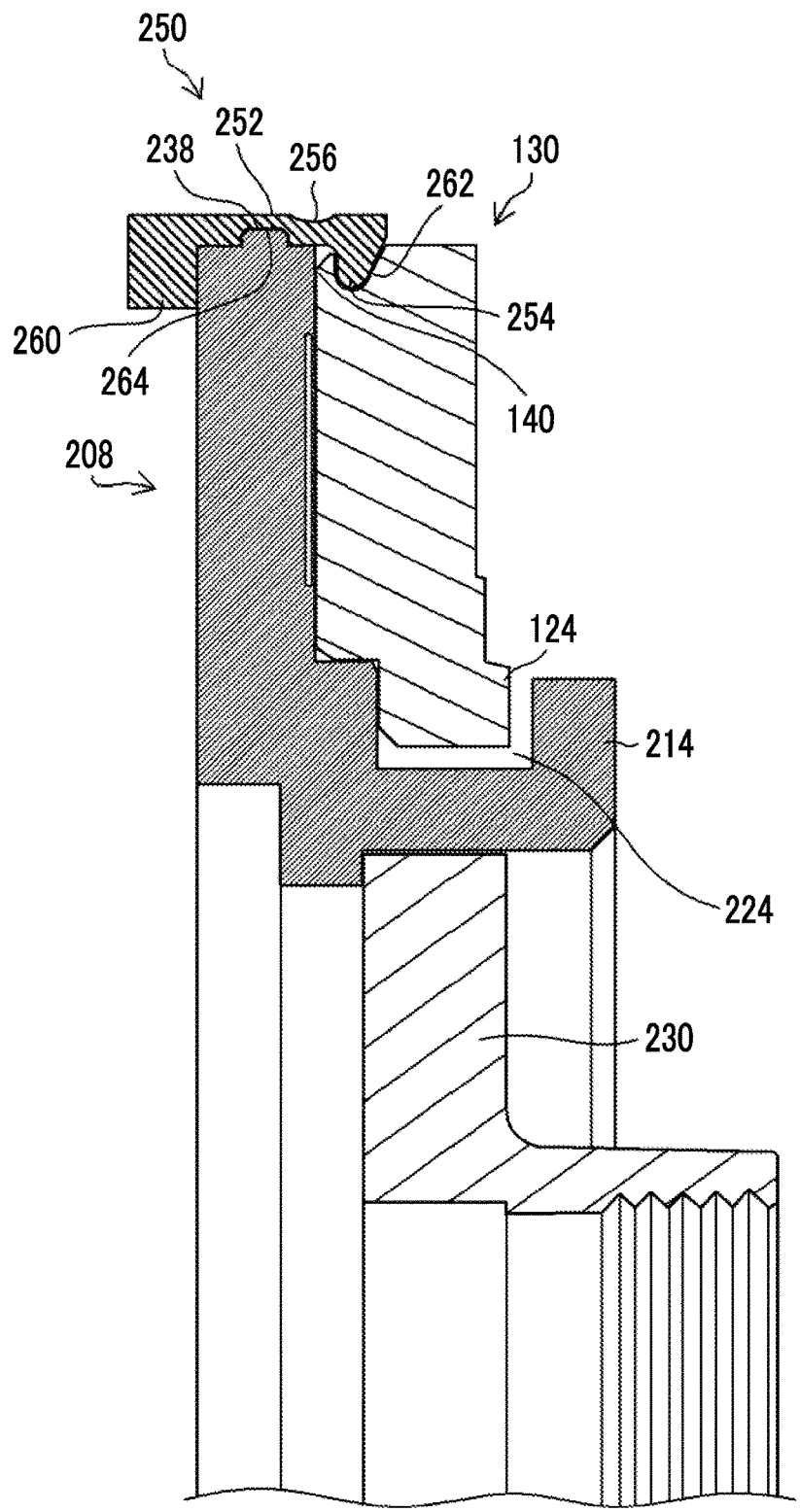
FIG. 8 is an enlarged cross-sectional view after the lens mount is mounted on the body mount.

FIG. 8 is an enlarged cross-sectional view after the lens mount is mounted on the body mount in a case where an elastic member 250 having another shape is used. The same components as components shown in FIG. 7 will be denoted by the same reference numerals as those shown in FIG. 7, and the description thereof will be omitted.

As shown in FIG. 8, the elastic member 250 comprises a cylindrical part 252 that includes a concave portion 264 provided on the inner peripheral side of a middle portion thereof. A convex portion 238 is provided on the outer periphery of the lens mount ring 208. The concave portion 264 of the elastic member 250 and the convex portion 238 of the lens mount ring 208 are engaged with each other. It is preferable that the elastic member 250 and the lens mount ring 208 are positioned by the engagement between the convex portion 258 and the concave portion 236.

As shown in FIGS. 7 and 8, the convex portion 258 or 238, which is provided on one of the elastic member 250 and the lens mount ring 208 of the lens mount, and the concave portion 236 or 264, which is provided on the other of the lens mount ring 208 of the lens mount and the elastic member 250, can be engaged with each other.

Figure 9:
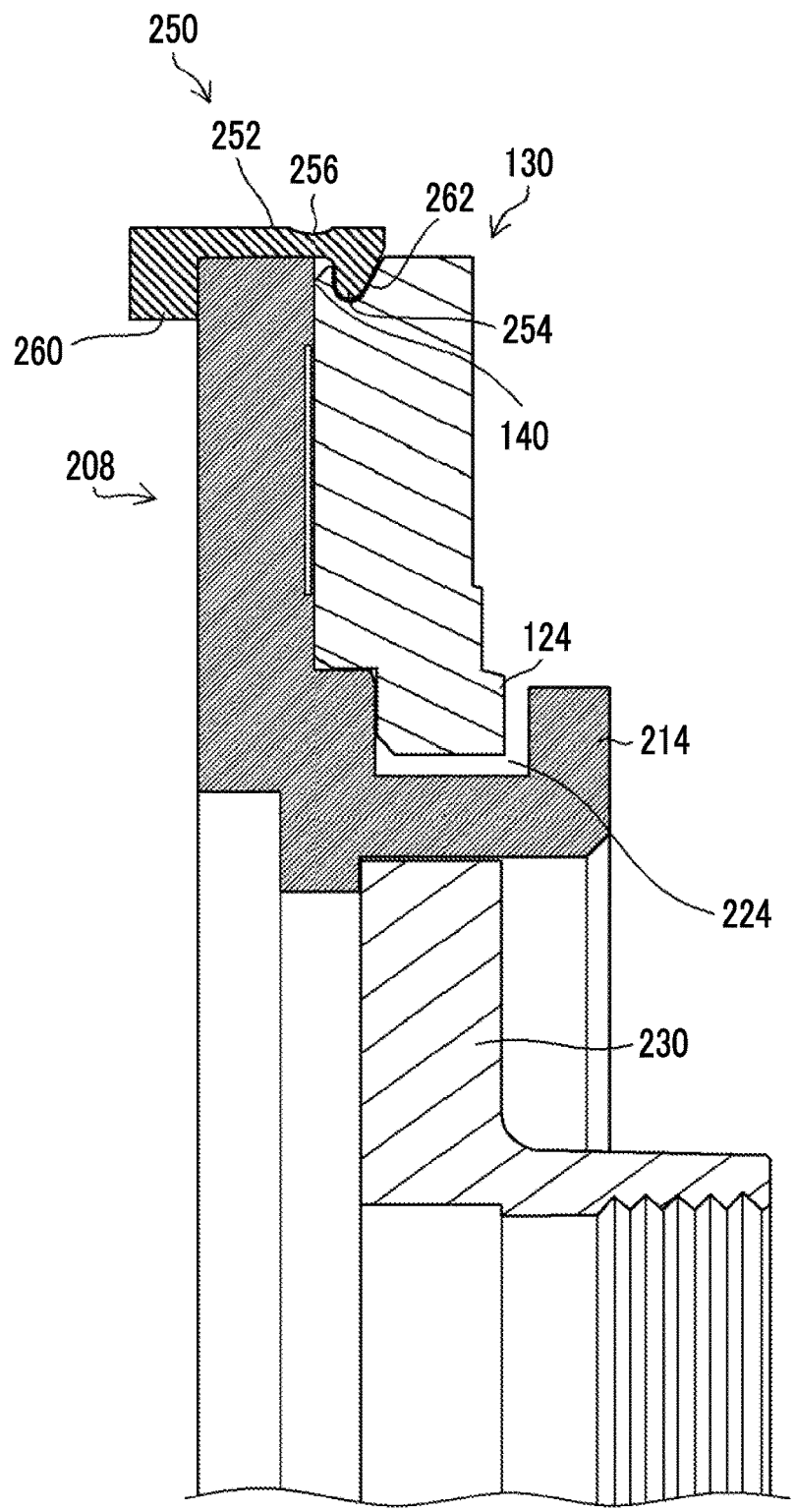
FIG. 9 is an enlarged cross-sectional view after the lens mount is mounted on the body mount.

FIG. 9 is an enlarged cross-sectional view after the lens mount is mounted on the body mount in a case where an elastic member 250 having another shape is used. The same components as components shown in FIGS. 7 and 8 will be denoted by the same reference numerals as those shown in FIGS. 7 and 8, and the description thereof will be omitted.

As shown in FIG. 9, the elastic member 250 comprises a cylindrical part 252 at which the inner peripheral side of a middle portion of the elastic member 250 is flat. Further, the outer periphery of the lens mount ring 208 is flat. As shown in FIG. 9, the elastic member 250 and the lens mount ring 208 may not include a concave portion and a convex portion that are to be engaged with each other. Since the inner peripheral side of the middle portion of the elastic member 250 is flat, the elastic member 250 can be easily mounted on an existing lens mount ring 208.

Since the annular elastic member 250 is fixed to the lens mount ring 208 by an elastic force, the elastic member 250 can be easily replaced.

EXPLANATION OF REFERENCES

1: camera system
100: camera body
102: shutter button
104: exposure correction dial
106: shutter speed dial
108: focus mode switching lever
110: finder switching lever
112: lens attachment/detachment button
114: power lever
116: hot shoe
118: electronic view finder
120: grip
122: body mount
124, 126, 128: body claw
130: body mount ring
132: locking pin
134: opening
136: signal contact
138: seat
140: chamfer
142: concave portion
144, 146, 148: mount spring
150: image sensor
200: lens unit
202: optical system
204: lens barrel 206: lens mount
208: lens mount ring
210: cylindrical portion
212: pin hole
214, 216, 218: bayonet claw
224, 226, 228: bayonet groove
230: mount cover
232: signal contact
234: seat
236: concave portion
238: convex portion
250: elastic member
252: cylindrical part
254: protruding portion
256: dent
258: convex portion
260: flange portion
262: chamfer
264: concave portion
OA: optical axis

What is claimed is:

1. A lens unit comprising:
an optical system that includes at least one lens;
a lens barrel that receives the optical system;
a lens mount that is provided on one end side of the lens barrel in a direction of an optical axis and includes a plurality of bayonet claws; and
an annular elastic member that is mounted on the lens mount,
wherein the elastic member includes a protruding portion that is positioned on the one end side and protrudes inward in a radial direction, and a dent that is positioned on an outer peripheral side opposite to the protruding portion so as to be closer to the other end side of the lens barrel than the protruding portion in the direction of the optical axis, and
the dent serves as fulcrum and allows the protruding portion of the annular elastic member to be displaced outward in the radial direction.

2. The lens unit according to claim 1,
wherein the dent has a shape of an arc.

3. The lens unit according to claim 2,
wherein the protruding portion has a cross section having a shape of a curved surface.

4. The lens unit according to claim 2,
wherein the protruding portion includes a chamfer on the one end side.

5. The lens unit according to claim 2, further comprising:
a convex portion that is provided on one of the elastic member and the lens mount; and
a concave portion that is provided on the other of the elastic member and the lens mount,
wherein the convex portion and the concave portion are engaged with each other.

6. The lens unit according to claim 1,
wherein the protruding portion has a cross section having a shape of a curved surface.

7. The lens unit according to claim 6,
wherein the protruding portion includes a chamfer on the one end side.

8. The lens unit according to claim 6, further comprising:
a convex portion that is provided on one of the elastic member and the lens mount; and
a concave portion that is provided on the other of the elastic member and the lens mount,
wherein the convex portion and the concave portion are engaged with each other.

9. The lens unit according to claim 1,
wherein the protruding portion includes a chamfer on the one end side.

10. The lens unit according to claim 9, further comprising:
a convex portion that is provided on one of the elastic member and the lens mount; and
a concave portion that is provided on the other of the elastic member and the lens mount,
wherein the convex portion and the concave portion are engaged with each other.

11. The lens unit according to claim 1, further comprising:
a convex portion that is provided on one of the elastic member and the lens mount; and
a concave portion that is provided on the other of the elastic member and the lens mount,
wherein the convex portion and the concave portion are engaged with each other.

12. A camera system comprising:
the lens unit according to claim 1; and
a camera body that includes a body mount including a body claw to be engaged with the bayonet claws of the lens unit,
wherein the protruding portion of the elastic member of the lens unit biases the body mount in the radial direction.

13. The lens unit according to claim 1, wherein thickness of the elastic member at the position of the dent is smaller than the thickness of the elastic member at any other positions.

14. An annular elastic member comprising:
a protruding portion that is positioned on one end side in a height direction and protrudes inward in a radial direction; and
a dent that is positioned on an outer peripheral side opposite to the protruding portion so as to be closer to the other end side than the protruding portion in the height direction, wherein
the dent serves as a fulcrum and allows the protruding portion of the annular elastic member to be displaced outward in the radial direction.

15. The elastic member according to claim 14, wherein thickness of the elastic member at the position of the dent is smaller than the thickness of the elastic member at any other positions.

16. The elastic member according to claim 14,
wherein the dent has a shape of an arc.

* * * * *